United States Patent [19]

Reagan et al.

[11] 4,049,578

[45] Sept. 20, 1977

[54] HYDROCARBON CONVERSION CATALYST

[75] Inventors: William J. Reagan, Yardley, Pa.; Nai Y. Chen, R.D. Titusville, N.J.

[73] Assignee: Mobil Oil Corporation, New York, N.Y.

[21] Appl. No.: 695,230

[22] Filed: June 11, 1976

Related U.S. Application Data

[63] Continuation-in-part of Ser. No. 477,240, June 7, 1974, Pat. No. 3,981,825.

[51] Int. Cl.$^2$ .................. B01J 21/04; B01J 23/42; B01J 23/46; B01J 23/72
[52] U.S. Cl. .................. 252/455 R; 252/466 PT; 208/138
[58] Field of Search ............ 252/455 R, 466 PT, 472, 252/474; 208/138

[56] References Cited

U.S. PATENT DOCUMENTS

| | | | |
|---|---|---|---|
| 3,507,781 | 4/1970 | Spurlock et al. | 252/466 PT |
| 3,528,768 | 9/1970 | Tucker | 252/455 Z |
| 3,901,827 | 8/1975 | Sinfelt et al. | 252/466 PT |
| 3,953,368 | 4/1976 | Sinfelt | 252/466 PT |

*Primary Examiner*—W. J. Shine
*Attorney, Agent, or Firm*—Charles A. Huggett; Raymond W. Barclay

[57] ABSTRACT

A metallic reforming catalyst, consisting of platinum and iridium or platinum, iridium and copper on a porous carrier provides excellent conversion of naphtha to $C_5+$ product. A method of incorporating the metals or metal compounds on the carrier and preparing the finished catalyst using dimethyl sulfoxide is a novel procedure and provides unexpected catalytic properties. Novel reforming operations using these catalysts under moderate or severe conditions do not drastically alter the product yield.

11 Claims, No Drawings

4,049,578

HYDROCARBON CONVERSION CATALYST

CROSS REFERENCE TO RELATED APPLICATION

This application is a continuation-in-part of application Ser. No. 477,240 filed June 7, 1974, now U.S. Pat. No. 3,981,825.

BACKGROUND OF THE INVENTION

1. Field of the Invention

This invention relates to a novel catalyst and particularly to a novel reforming catalyst. It also relates to a method for producing the catalyst and to reforming operations employing the same.

2. Description of the Prior Art

Catalytic reforming is a well known petroleum refining procedure. Essentially, a naphtha feedstock is treated to improve the octane rating for use as a gasoline. A number of reactions occur in typical reforming. The naphthenic components are dehydroisomerized and dehydrogenated to aromatics. Paraffins are dehydrocyclized to naphthenes and aromatics; normal paraffins are isomerized to isoparaffins. The resulting product should be high in $C_5^{30}$ product (components having a boiling point of pentane or higher).

Catalysts containing platinum, such as platinum on alumina, are known and have been widely used in naphtha reforming. Catalysts containing platinum and tungsten on alumina by impregnation with water, benzene or ethyl alcohol solutions (U.S. Pat. No. 3,661,769) and platinum, iridium and tin on alumina or other porous carriers by impregnation with water, either or alcohol solutions (U.S. Pat. No. 3,718,578) are also known. U.S. Pat. Nos. 3,528,768 and 3,630,966 have disclosed the use of dimethylsulfoxide to incorporate Group VIII and other metals with zeolites. Platinumrhenium on alumina is another known commercial reforming catalyst (U.S. Pat. No. 3,558,479). Reforming catalysts are usually described as being selective, active and stable. Selectivity is the measure of the ability of a catalyst to produce aromatic compounds from naphthenes and paraffins; activty is the overall ability of a catalyst to convert the feedstock into $C_5^{30}$ product; catalyst stability enables the catalyst to remain selective and active over an extended period.

The catalysts of the present invention exhibit excellent properties in all of the aforesaid characteristics.

SUMMARY OF THE INVENTION

It has now been discovered that a stable, active catalyst consisting of platinum and iridium or platinum, iridium and copper may be incorporated with a porous solid support using a dimethylsulfoxide solvent solution containing soluble compounds of said metals to provide excellent reforming conversion with $C_5^{30}$ yield. A novel method of preparing hydrocarbon conversion catalysts has also been discovered wherein a solution of compounds of two or more metals in dimethylsulfoxide (hereinafter referred to as DMSO) is mixed with a solid carrier and the resulting solids are recovered. A novel process for reforming a naphtha feedstock using the catalysts of this invention has also been discovered.

DESCRIPTION OF SPECIFIC EMBODIMENTS

The catalysts of this invention consist of a solid porous support containing platinum and iridium or platinum, iridium and copper. Thus, these catalysts may contain platinum and iridium in a weight ratio of 0.001 to 10:0.001 to 10. The catalysts may contain any variety of the aforesaid metals. Platinum-iridium-copper is the preferred. The amounts of each of the metals in such catalysts may range from 0.001 to 10:0.001 to 10:0.001 to 10 on a weight ratio. The total concentration of all metal components on the porous solid carrier is in the range of 0.005% to about 10% by weight, and preferably from 0.1% to 5%.

The solid porous carrier of this invention may be any inorganic solid, such as charcoal, or the inorganic oxides, such as alumina, silica, magnesia, thoria, boria, zirconia, aluminosilicates, such as zeolites, and the like. Mixtures of these may be used such as silica and alumina, magnesia and alumina, magnesia and zirconia, alumina and boria, alumina and aluminosilicate, silica and magnesia, silica, alumina and magnesia and the like. Alumina is a desirable carrier for reforming catalysts, and is preferred in the invention.

The catalysts of this invention are very active reforming catalysts, hence conditions of operation may be severe. While normal liquid hourly space velocity (LHSV) or the volume of liquid feed per hour through the catalyst is from 0.5 to 5, or more usually 1 to 3, the LHSV for catalysts of this invention may be the same or much higher and may even exceed 20. Alternatively, the feedstock may be less severely pretreated to remove sulfur than normally necessary. Sulfur has a poisoning effect on some reforming catalysts. The catalysts of this invention can tolerate a higher level of sulfur than such conventional reforming catalysts. In fact, sulfur added to the cataor present in the reformer feedstock itself, measured as over 1 ppm in the reformer effluent, may even be desirable in this invention.

In part this activity and stability stems from the combination of platinum group and copper. Trimetallic catalysts prepared by customary practices, aqueous impregnation of carrier with metallic cations or anions, produce reformate of very good research octane numbers (R + O, or unleaded). However, catalysts prepared by our preferred method are even more active and have extraordinary stability.

Essentially, the most preferred method of preparation is to dissolve DMSO-soluble compounds of the selected metals in DMSO and combine with the carrier at from 20° to 200° C. The porous carrier, in the form of particles of reduced size, is added to the said DMSO solution, the metals and carrier being in suitable concentrations to obtain the desired metal ratios and weight percents. Preferably excess DMSO solution is used in this preparation. The mixture is stirred for from 30 minutes to about 10 hours, preferably under reflux conditions. While the mixing of the carrier with DMSO solution may be carried out at lower temperatures, i.e. room temperature, a preheated solution may also be effective. The solids are then filtered out, washed again in DMSO and, preferably, water, then dried and calcined at a temperature of from 300° C. to about 600° C., preferably 350° C. to 500° C. The water wash, normally not employed in aqueous impregnation methods, is a desirable step in this procedure. Soluble metal compounds are the halides, halide acids, nitrates, carbonates, ammines, ammine halides and the like.

If desired, one metal component may be incorporated with the carrier by any means, i.e. with DMSO or aqueous impregnation, and the resulting solid either directly or after drying and/or calcining incorporated with one or more different metals by DMSO solution. The solid is then dried and calcined after such treatment.

While not wishing to be limited to a particular theory underlying the distribution of the metals on the solid carrier, it is believed that the metals to some degree form an alloy, either a two-metal or three-metal alloy, which is uniformly distributed in the pores of the solid carrier. Perhaps the DMSO solution of metal compounds undergoes some interaction with the porous carrier as well or the DMSO forms a complex with one or more of the metals. The metal may wholly or in part exist in the form of the reduced metal or as the initial salt or as a sulfide remaining after the heating and possible decomposition of DMSO or as a compound of a DMSO-decomposition product. That an alloy may also be present is seen in the unusual activity and stability of the catalyst made by this preferred process. Analysis has established that the metals are present after the calcining step.

Conventional methods of preparation generally include subjecting the carrier to aqueous impregnation by a solution containing water-soluble compounds of the metals, preferably halides or halide acids followed by drying and calcining the resulting product. The multimetallic catalysts of this invention produced by this aqueous impregnation procedure provide less satisfactory reforming results than by the DMSO procedure.

The following examples will illustrate the novel and conventional preparations and use of the novel reforming catalysts of this invention. Percentages are on a weight basis, unless otherwise specified. Metal contents of the catalyst stated in the examples may refer to the reduced metal or to metal compounds or both.

EXAMPLE 1

In a suitable vessel, 0.2323 grams of $H_2PtCl_6.6H_2O$, 0.025 grams $IrCl_3.3H_2O$ and 0.022 grams $CuCl_2.2H_2O$ were dissolved in 160 ml of dimethylsulfoxide (DMSO). This DMSO solution was combined with 25 grams of eta-alumina. The mixture was then refluxed for three hours at 150° C. The mixture was cooled and the solids filtered off. The solids were washed with 50 ml DMSO and then with 150 ml $H_2O$. The washed product was dried under vacuum (20 in.Hg) at 120° C for 16 hours. The dried product was calcined at 480° C for 3 hours in flowing air. The finished catalyst contained 0.35% platinum, 0.05% iridium, and 0.33% copper.

EXAMPLE 2

A catalyst that contained 0.35% platinum, 0.05% iridium, and 0.033% copper was prepared by an aqueous impregnation procedure. The appropriate amounts of the metal salts were dissolved in acidic (with dilute acetic acid) aqueous solution. The solution was then applied to the eta-alumina support. Drying at 120° C was followed by air calcination at 480° C for three hours.

EXAMPLE 3

With the same procedures described in Example 1, 0.2323 grams $H_2PtCl_6.6H_2O$, and 0.062 grams $IrCl_4.3H_2O$ were dissolved in 80 ml DMSO. This solution was mixed with 35.2 grams of a commercial alpha-monohydrate alumina. After the preparation was completed, the product contained 0.35 weight percent platinum and 0.1 weight percent iridium.

EXAMPLE 4

A catalyst that contained 0.35% platinum and 0.1% iridium was prepared by an aqueous impregnation method. The appropriate amounts of the metal salts were dissolved in water. The commercial alpha-monohydrate alumina was then impregnated with this aqueous solution. The finished catalyst was obtained after air calcination procedures.

The above products were used as catalysts for the reforming of a $C_6$-200° F naphtha. The following test conditions were employed: pressure: 200 psig; $H_2$/HC mole ratio: 15/1; LHSV = 4.0; temperature: 900° F.

A comparison was made of activity ($C_5+R+O$) land selectivity ($C_5+$ yield) differences between Examples 1 and 2 (platinum, iridium, copper) in Table I and of differences between Examples 3 and 4 (platinum, iridium) in Table II set forth below.

TABLE I

| Hydrocarbon Product | Example 1 DMSO Method | Example 2 Aqueous Method |
|---|---|---|
| $C_1$ | 0.7 | 0.9 |
| $C_2$ | 2.1 | 2.1 |
| $C_3$ | 3.6 | 3.8 |
| $iC_4$ | 2.6 | 2.2 |
| $nC_4$ | 2.3 | 2.5 |
| $iC_5$ | 3.2 | 2.7 |
| $nC_5$ | 2.8 | 3.5 |
| $2,2DMC_4$ | 2.7 | 2.6 |
| $2,3DMC_4, 2MC_5$ | 13.5 | 14.0 |
| $3MC_5$ | 8.6 | 9.1 |
| $nC_6$ | 10.9 | 12.7 |
| $2,2DMC_5$ | 0.9 | 0.7 |
| $2,4DMC_5, MCP$ | 1.7 | 1.8 |
| Benzene | 12.9 | 11.8 |
| $2,3DMC_5$ | 0.8 | 0.7 |
| $2MC_6$ | 3.2 | 3.6 |
| $2,3DMC_6$ | 1.2 | 1.4 |
| $3MC_6$ | 3.9 | 4.3 |
| $3EtC_5, DMCyC_5$ | 1.0 | 0.8 |
| $nC_7$ | 2.8 | 2.9 |
| Toluene | 18.6 | 15.9 |
| $C_5+(R+O)$ | 78.2 | 75.1 |
| $C_5+$ yield, wt.% | 89.9 | 88.4 |
| Δyield at 75.1 R+O | +3.4 | base |
| Δactivity at 75.1 R+O | +20° F | base |

TABLE II

| Hydrocarbon Product | Example 3 DMSO Method | Example 4 Aqueous Method |
|---|---|---|
| $C_1$ | 2.2 | 2.4 |
| $C_2$ | | |
| $C_3$ | 2.8 | 3.0 |
| $iC_4$ | 1.6 | 1.5 |
| $nC_4$ | 2.0 | 2.2 |
| $iC_5$ | 2.4 | 2.3 |
| $nC_5$ | 3.5 | 3.7 |
| $2,2DMC_4$ | 2.5 | 2.4 |
| $2,3DMC_4, 2MC_5$ | 13.9 | 14.3 |
| $3MC_5$ | 8.7 | 9.1 |
| $nC_6$ | 12.6 | 13.2 |
| $2,2DMC_5$ | 0.1 | 0.1 |
| $2,4DMC_5, MCP$ | 2.6 | 2.7 |
| Benzene | 12.5 | 11.9 |
| $2,3DMC_5$ | 0.6 | 0.6 |
| $2MC_6$ | 3.5 | 3.8 |
| $2,3DMC_5$ | 1.3 | 1.6 |
| $3MC_6$ | 4.3 | 4.7 |
| $3ETC_5, DMCyC_5$ | 0.8 | 1.0 |
| $nC_7$ | 3.2 | 3.4 |
| Toluene | 17.9 | 15.7 |
| $C_8+$ | 0.8 | 0.4 |
| $C_5+(R+O)$ | 77.2 | 74.5 |
| $C_5+$ yield, wt.% | 91.4 | 90.9 |
| Δyield at 74.5 R+O | +2.1 | base |
| Δactivity at 74.5 R+O | +18° F | base |

In the above tables, the term "Δ Yield" refers to the difference in the $C_5+$ yield for the catalysts made by the conventional aqueous impregnation procedure and those of the examples at the octane number of each of the catalysts of this invention. The term "Δ Activity" refers to the difference in temperature required by the catalysts made by the conventional aqueous impregnation procedure and the catalysts of this invention to reach a given octane number.

From the above results and comparisons, it will be evident that the catalysts prepared by the DMSO method are more active and selective than catalysts prepared by conventional aqueous impregnation procedures.

While this invention has been described by illustration with specific examples, we contemplate other uses and modifications known in the industry which would be applicable thereto and would thus fall within the scope of the invention and of the following claims:

We claim:
1. A reforming catalyst comprising a solid porous alumina support containing platinum and iridium or platinum, iridium and copper, said catalyst being prepared by the process of applying to said support a dimethylsulfoxide solution containing soluble compounds of the metals, selected from the group consisting of metal salt, metal acid, metal ammine and metal ammine halide, drying the resulting solids and calcining.
2. The catalyst of claim 1 wherein the solid porous support is eta-alumina.
3. The catalyst of claim 1 wherein the solid porous support is alpha monohydrate alumina.
4. The catalyst of claim 1 wherein the porous support is a mixture of alumina and an aluminosilicate.
5. The catalyst of claim 1 wherein the metals are platinum and iridium.
6. The catalyst of claim 1 wherein the metals are platinum, iridium and copper.
7. The catalyst of claim 1 wherein said compounds of the metals are joined with the solid porous support by dissolving said compounds of the metals in dimethylsulfoxide, mixing the dimethylsulfoxide solution with the solid porous support, heating the resulting slurry, recovering the solids therefrom, drying the solids and calcining.
8. The catalyst of claim 7 wherein the recovered solids are washed first in dimethylsulfoxide and then in water prior to said drying and calcining.
9. A process for the preparation of the catalyst of claim 1 comprising mixing the solid porous support with a solution of the said soluble metal compounds in dimethylsulfoxide, subjecting the resulting slurry to refluxing, separating the solids from the slurry, drying the solids and calcining.
10. The process of claim 9 wherein the soluble metal salts are chloroplatinic acid and iridium chloride.
11. The process of claim 9 wherein the soluble metal salts are chloroplatinic, acid, iridium chloride and copper chloride.

* * * * *

UNITED STATES PATENT AND TRADEMARK OFFICE
CERTIFICATE OF CORRECTION

PATENT NO. : 4,049,578
DATED : September 20, 1977
INVENTOR(S) : WILLIAM J. REAGAN and NAI Y. CHEN It is certified that error appears in the above–identified patent and that said Letters Patent are hereby corrected as shown below:

Column 1, line 25, "$C_5 30$" should be --$C_5^+$--.
Column 1, line 44, "$C_5 30$" should be --$C_5^+$--.
Column 1, line 56, "$C_5 30$" should be --$C_5^+$--.
Column 3, line 49, "0.33%" should be --0.033%--.

Signed and Sealed this

Thirtieth Day of May 1978

[SEAL]

Attest:

RUTH C. MASON
Attesting Officer

LUTRELLE F. PARKER
Acting Commissioner of Patents and Trademarks